June 23, 1925.
A. JACOBSON
FISHHOOK
Filed Dec. 15, 1924
1,542,942
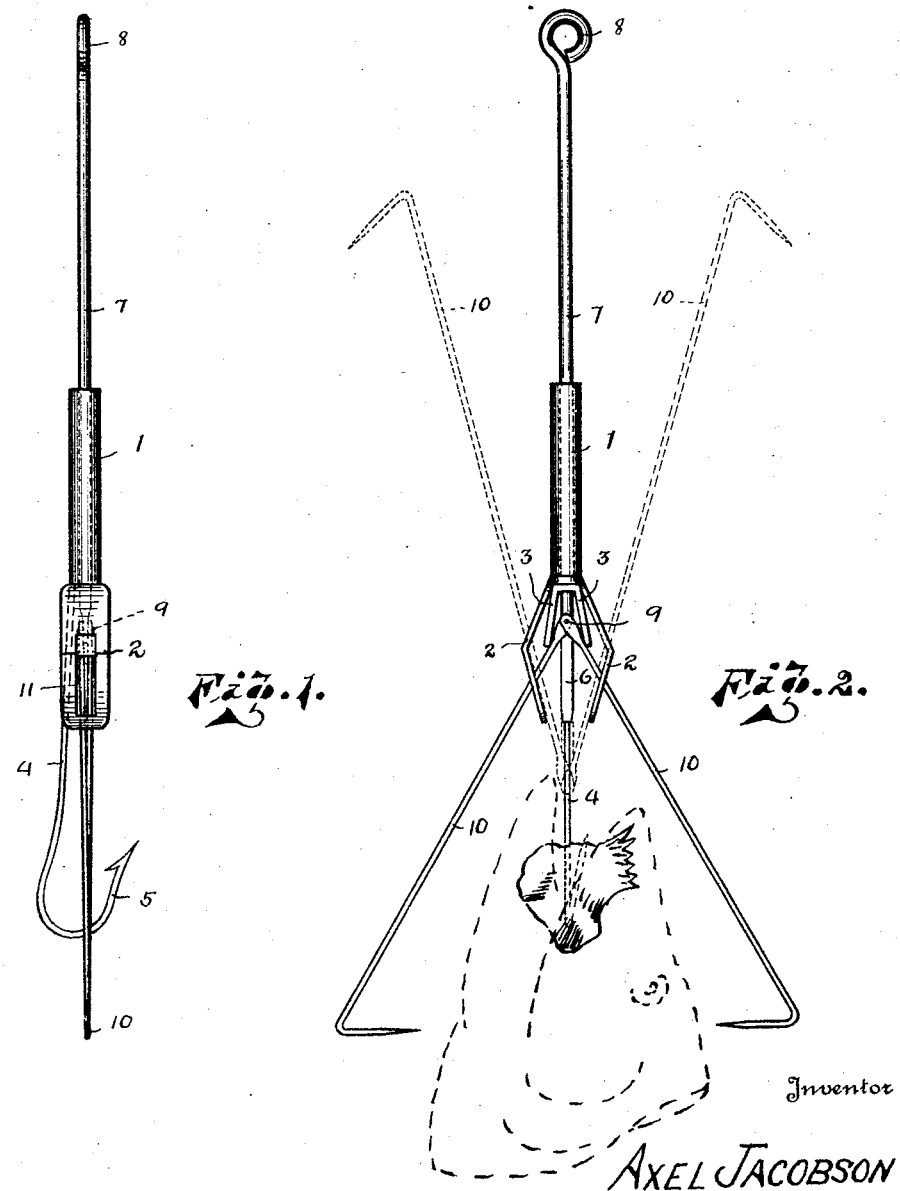
Inventor
AXEL JACOBSON
By Geo Stevens
Attorney Patented June 23, 1925.

1,542,942

UNITED STATES PATENT OFFICE.

AXEL JACOBSON, OF TWO HARBORS, MINNESOTA.

FISHHOOK.

Application filed December 15, 1924. Serial No. 755,869.

*To all whom it may concern:*

Be it known that I, AXEL JACOBSON, a subject of the King of Sweden, residing at Two Harbors, in the county of Lake and State of Minnesota, have invented certain new and useful Improvements in Fishhooks, of which the following is a specification, reference being had therein to the accompanying drawing.

This invention relates to fish hooks and has special reference to a combination fish hook and trap.

The principal object of the invention is to produce a novel combination which will insure a catch.

Another object is to produce such a device that will avoid the tendency of alarm on the part of a prospective catch.

Another object is that of providing means whereby the device may be set at any degree of tension.

Other objects and advantages of the invention will appear in the further description thereof.

Referring now to the accompanying drawing forming part of this application and in which like reference characters indicate like parts:

Figure 1 is a side elevation of the device as it would appear sprung in the act of making a catch, and Figure 2 is a similar view at right angles to Figure 1.

1 represents a tubular body portion, preferably constructed of metal and having rigidly fixed to the lower end thereof a fabricated head-like portion comprising the two opposed thin flat metal wings 2, which are so constructed as to diverge downwardly and then converge slightly, the diverging and converging portions being of substantially the same length. A second pair of similarly opposed divergent wings are shown as at 3, they being installed within the wings 2 and spaced therefrom, and are but half the length thereof.

Rigidly fixed to the lower end of the tubular body portion 1 at the juncture of it and the fabricated head, in any desired manner, is the shank 4 of the hook 5. As a reinforcement for said shank I have illustrated a tubular enlargement 6 which may or may not be employed. Thus the body portion 1, the head, and the hook 5, become integral portions.

Reciprocably mounted within the tubular body 1 is the wire-like supporting shank 7 having the eye 8 at its upper end for engagement with the fish line, while upon its lowermost end and within the head 2 it pivotally carries as at 9, the two grab hooks or gaffs 10 which considerably overlap the hook 5 when in their lowermost or sprung position.

When in this position the pivotal ends of the gaffs 10 are intermediate of the inner wings 3 of the fabricated head, and, if the shank 7 is drawn upwardly in opposition to a downward draft of the hook 5, this pivotal point will be drawn inwardly in respect to the divergent wings 3 and the free ends of the gaffs thus forcibly drawn towards each other in engagement with the object producing the draft upon the hook 5, which presumably would be a fish, though it is apparent other creatures may be caught in the same manner.

The gaffs 10 are laterally guided in their pivotal movement by each extending through a slot 11 in the converging portions of the wings 2 of the head, so that they are at all times directly opposite each other, and it is apparent that if desired three or four gaffs may be employed instead of two with corresponding modifications in the construction of the head.

Now when the trap hook is set, the bait as is obvious is placed upon the hook 5, and the shank 7, in respect to the body 1, is forced downwardly to its lowermost desired extremity which will bring the pivotal point of the gaffs below the termini of the wings 2 as shown in dotted lines Figure 2, and, as is apparent, if this pivotal connection is forced sufficiently far, the shanks of the gaffs 10 will strike against the upper termini of the slots 11, and further pressure downwardly upon their pivotal connection will cause them to be frictionally bound intermediate of the termini of the wings 2, and this frictional contact may be increased or diminished in respect to the anticipated draft on the hook.

From the foregoing it is evident that I have produced a novel form of hook trap which not only in appearance is an enticing fish lure but one embodying the elements of a trap which insures to a great extent a catch; and a trap that may be set to any degree of nicety desired so that even the tendency of a fish to nibble and steal a bait will insure its being caught.

Having thus described my invention, what

I claim and desire to secure by Letters Patent, is:

1. A fish hook of the class described comprising a cylindrical body portion having spaced guiding wings extending downwardly from the lower end thereof, a bait hook permanently attached to the lower end of the body portion extending downwardly intermediate of the guide wings and below same, a reciprocable line engaging shank carried axially within the body portion, the lower end being operable intermediate of the guide wings, and gaff hooks pivotally attached to the lower extremity of the shank and operable within the guide wings.

2. A fish hook of the class described comprising a cylindrical body portion having spaced guiding wings extending downwardly from the lower end thereof, spaced hook engaging wings intermediate of the guide wings, a bait hook permanently attached to the lower end of the body portion extending downwardly intermediate of the guide wings and below same, a reciprocable line engaging shank carried axially within the body portion the lower end being operable intermediate of the guide wings, and gaff hooks pivotally attached to the lower extremity of the shank and operable within the guide wings.

In testimony whereof I hereunto affix my signature.

AXEL JACOBSON.